Jan. 26, 1932.  L. M. WOOLSON  1,842,468
INTERNAL COMBUSTION ENGINE
Filed Oct. 26, 1929
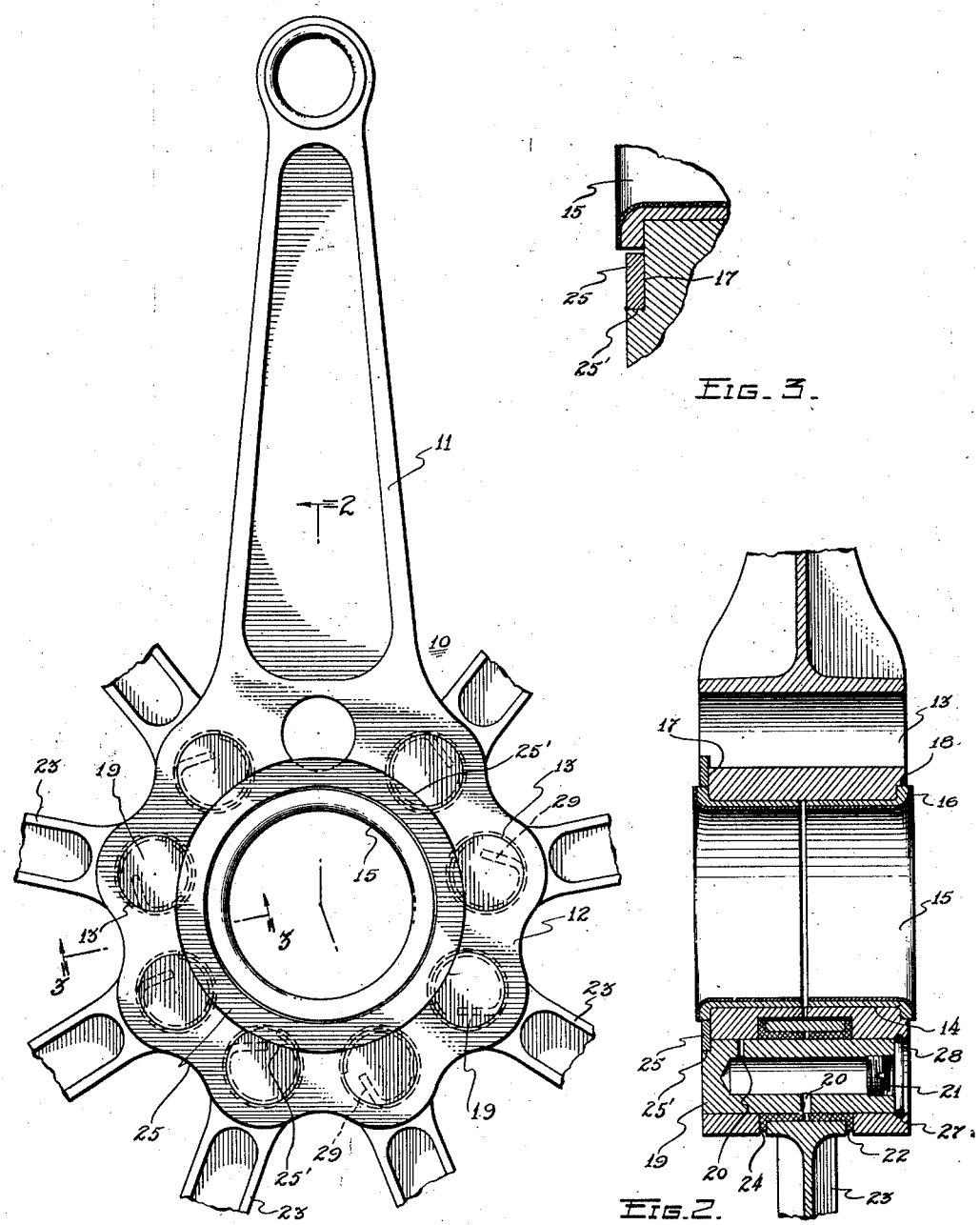
Inventor
Lionel M. Woolson Patented Jan. 26, 1932

1,842,468

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed October 26, 1929. Serial No. 402,566.

This invention relates to internal combustion engines, and more particularly to connecting rod assemblies.

An object of the invention is to provide a simple form of locking mechanism for the knuckle pins in a connecting rod assembly for radial engines.

Another object of my invention is to provide a connecting rod assembly for radial engines with a single member for locking all of the knuckle pins against rotation.

A further object of my invention is to provide a connecting rod assembly for radial engines with a single element which is arranged to prevent rotation and endwise displacement in one direction of all of the knuckle pins.

Still another object of my invention is to provide a connecting rod assembly for radial engines in which the knuckle pins can be quickly assembled and secured in position in the master rod.

These and other objects of the invention will appear from the following description taken in connection with the drawings, which form a part of this specification, and in which:

Fig. 1 is a fragmentary elevation of a connecting rod assembly for radial engines showing my invention associated therewith;

Fig. 2 is a sectional view of the same taken on line 2—2 of Fig. 1; and

Fig. 3 is a fragmentary section of the same taken on line 3—3 of Fig. 1.

Referring to the drawings by characters of reference, 10 represents generally the master rod of a connecting rod assembly for a radial type of engine which consists of the rod portion 11 and the hub portion 12. The hub is formed with a plurality of apertures 13, which are equally spaced and arranged in a circular relation, and a central bore 14. A two part bearing 15 is carried within the bore and the ends 16 thereof terminate in a flange, such flanges extending into recesses 17 and 18 at the ends of the hub.

A hollow knuckle pin 19 extends through each of the apertures 13 in the hub, such pins having passages 20 therein to permit circulation of lubricant and being closed at one end by a screw plug 21. A split bearing 22 is carried by each of the knuckle pins, and one end of a connecting rod 23 encircles the bearing. The master rod hub is formed with recesses 24 for the reception of the connecting rod ends which are pivotally carried by the knuckle pins.

It is desirable that provisions be made to assemble the connecting rod structure as quickly and cheaply as possible, and to this end I provide locking means for the knuckle pins which are simple and quickly applied. To this end I provide a metal ring 25 which lies in the recess 17 in the end of the master rod hub so that its outer face is flush with the end wall surface of the hub. The knuckle pins are formed at one end with a recess into which the ring extends and engages the wall 25′ which will prevent rotation of the pins in the apertures. The locking ring is preferably secured to the hub by welding the edges thereof to the adjacent wall of the master rod hub intermediate the knuckle pins. The locking ring thus serves to prevent endwise displacement and rotation of the knuckle pins. A circular groove 27 is formed in the master hub adjacent the end of each knuckle pin, and a spring lock ring 28 is snapped into such grooves to prevent axial displacement of the pins. The lock rings have a bent end 29 which allows the same to be easily grasped for removal from the hub.

It will be seen that the ring provides a simple locking means for all of the pins. The snap spring locks can be readily assembled or removed, and when removed the knuckle pins can be removed, thus permitting the connecting rods to be removed from the hub. With such locking means, the connecting rod assembly can be quickly associated or taken apart.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What I claim is:

1. In a connecting rod assembly for radial engines, a master rod hub having apertures therethrough, knuckle pins in the hub apertures, connecting rods carried by the pins, a single element permanently secured to the hub and engaging one end of all of the pins to prevent their rotation in the hub and endwise displacement in one axial direction, and means detachably associated with the hub in a relation to prevent endwise displacement of the pins in the other axial direction.

2. In a connecting rod assembly for radial engines, a master rod hub having apertures therethrough, knuckle pins in the hub apertures, said pins being axially removable from the hub, connecting rods carried by the pins, a single element permanently secured to the hub and engaging one end of the pins to prevent their rotation and their axial displacement in one direction, and individual members removably associated with the hub to prevent axial displacement of the pins through the opposite side of the hub from the permanently secured element.

3. In a connecting rod assembly for radial engines, a master rod hub having apertures therethrough, knuckle pins in the hub apertures, connecting rods carried by the pins, an element permanently secured to the hub preventing endwise displacement in one direction and rotation of all of the pins, and removable means secured to the hub to prevent endwise displacement of the pins in a direction opposite that which the permanently secured member prevents.

4. In a connecting rod assembly for radial engines, a master rod hub having apertures therethrough, knuckle pins in the hub apertures having a recessed end, connecting rods carried by the pins, means welded to the hub and engaging in the pin recesses to prevent their rotation, and endwise displacement in one direction, and removable means secured to the hub to prevent endwise displacement of the pins in a direction opposite that which the permanently secured member prevents.

5. In a connecting rod assembly for radial engines, a master rod hub having apertures therethrough, knuckle pins in the hub apertures, connecting rods carried by the pins, means permanently fixed to the hub with which one end of the pins engage to prevent their rotation and endwise displacement, and removable means secured to the hub to prevent endwise displacement of the pins in a direction opposite that which the permanently secured means prevents.

6. In a connecting rod assembly for radial engines, a master rod hub having apertures therethrough, knuckle pins in the hub apertures, connecting rods carried by the pins, locking means at one end of the hub preventing rotation and endwise displacement of the pins, and independent removable locking means for each of the other ends of the pins, said removable locking means engaging the hub within the apertures.

7. In a connecting rod assembly for radial engines, a master rod hub having apertures therethrough, knuckle pins in the hub apertures, connecting rods carried by the pins, locking means secured permanently to one end of the hub and engaging the pins to prevent their rotation and endwise displacement, and displacement preventing means for the other end of the pins removably secured to the hub.

8. In a connecting rod assembly for radial engines, a master rod hub having apertures formed therein, connecting rod pins in the apertures in the hub, means forming a permanent part of the hub engaging one end of the pins to prevent their rotation and endwise displacement in one direction, and means detachably associated with the hub in a relation to prevent endwise displacement of the pins in the other direction.

9. In a connecting rod assembly for radial engines, a master rod hub having apertures formed to extend therethrough, connecting rod pins in the apertures in the hub, means forming a permanent part of the hub and engaging one end of the pins to prevent their rotation and endwise displacement in one direction, and individual means associated with the other end of each pin and detachably connected with the hub to prevent endwise displacement of the pins in the opposite direction to that prevented by the means engaging the pins.

In testimony whereof I affix my signature.

LIONEL M. WOOLSON.